US012618475B2

(12) United States Patent (10) Patent No.: US 12,618,475 B2

Hernandez Sanchez (45) Date of Patent: May 5, 2026

(54) BACK FLOW VALVE

(71) Applicant: Pascual Hernandez Sanchez, Los Angeles, CA (US)

(72) Inventor: Pascual Hernandez Sanchez, Los Angeles, CA (US)

( * ) Notice: Subject to any disclaimer, the term of this patent is extended or adjusted under 35 U.S.C. 154(b) by 24 days.

(21) Appl. No.: 18/809,295

(22) Filed: Aug. 19, 2024

(65) Prior Publication Data

US 2025/0067343 A1 Feb. 27, 2025

Related U.S. Application Data

(60) Provisional application No. 63/628,768, filed on Aug. 21, 2023.

(51) Int. Cl.
| | |
|---|---|
| *F16K 1/14* | (2006.01) |
| *F16K 31/20* | (2006.01) |
| *F16K 37/00* | (2006.01) |

(52) U.S. Cl.
CPC ................ F16K 1/14 (2013.01); F16K 31/20 (2013.01); F16K 37/0083 (2013.01)

(58) Field of Classification Search
CPC ......... F16K 1/14; F16K 31/20; F16K 37/0083
See application file for complete search history.

(56) References Cited

U.S. PATENT DOCUMENTS

| | | | | |
|---|---|---|---|---|
| 3,428,078 A | * | 2/1969 | Christopher | ............ F16K 31/22 137/448 |
| 3,473,609 A | * | 10/1969 | Allen | ...................... E21B 33/16 137/71 |
| 3,610,275 A | * | 10/1971 | Determan | ............... F16K 31/22 137/430 |
| 2015/0300542 A1 | * | 10/2015 | Graham | .............. F16L 19/0206 285/393 |
| 2019/0032322 A1 | * | 1/2019 | Griebel | ................... F16K 31/20 |
| 2019/0136495 A1 | * | 5/2019 | Villalobos Lopez | ........................ F16K 15/042 |
| 2022/0065364 A1 | * | 3/2022 | Venek | ...................... E03F 5/08 |

* cited by examiner

*Primary Examiner* — Patrick C Williams

(74) *Attorney, Agent, or Firm* — Lewis Brisbois Bisgaard & Smith LLP; Josephine Brosas

(57) ABSTRACT

A novel backflow valve for use in homes and apartments, which can serve to prevent back flow such as when there is downstream clogging, is described herein. The operational part of the valve includes a washer maintained with the valve housing and a floatable ball wherein in the non-engaged position allows for the free draining of water, and in the engaged position, when drain water is backflowing into the valve housing, the ball floats and engages with the washer to seal the opening and prevent further backflow. There is a platform on which the floating device is in contact with, and allows a rolling motion, for a free flowing and unobstructed water flow when in the non-engaged position. Also described herein is a leak alert system which may be incorporated into the backflow valve assembly of the present invention.

19 Claims, 9 Drawing Sheets

BACK FLOW VALVE

CROSS-REFERENCE TO RELATED APPLICATION

This application claims the benefit of U.S. provisional application No. 63/628,768, filed on Aug. 21, 2023 and entitled "IMPROVED BACK FLOW VALVE." The contents of the above application are hereby incorporated by reference herein.

FIELD OF INVENTION

This invention relates generally to an improved back flow valve assembly, one suited for insertion into drain lines in a new residential construction, or incorporated into an already existing drain line, especially drains from sinks, tubs and the like to prevent unwanted backflow. Aspects of the invention also include embodiments of a leak sensor and alarm which may be implemented with the back flow valve assembly, and which, as an option, may also include the ability to communicate wirelessly such as through an application (or an "app"), via voice message, text message, email, and/or other communication methods to the property owner, manager, resident, person responsible for a dwelling, call center or other designated contacts in the event of a leak.

BACKGROUND

A frequent problem in multistory apartment buildings and two or more story homes is the problem of overflow when a sink faucet, tub shower head or spout on an upper floor is left running for an extended period of time. This is a particular problem where there exists a clogged drain downstream from the unit. In addition to the potential of overflow in the subject unit, when the unit is connected to a drain serving other units, overflow due to back flow can occur in those sinks, tubs, etc. connected at a point upstream of the clog in the drain system. And water is one of the most destructive elements to building interiors. When a leak incident occurs but is not timely addressed, the water consuming unit having the leak incident can suffer large amounts of water damage.

There are currently on the market a number of back flow valves offered. One problem with these valves is that they are relatively expensive and cumbersome to install. Another is that while they prevent insects from entering inside an apartment through water pipes, they do not prevent flooding. Further, none have a floating device that can seal the drain at the first sign of water back pressure. Even further, none have a platform on which the floating device can be in contact with and roll, to allow free flowing and unobstructed water flow.

What is needed is a new, simplified back flow valve assembly that is reliable, easy to assemble and install, and relatively inexpensive. There is also a need to have the option of an alarm or notification system that will send an audible or other notification signal when there is a leak detected. Water leak detectors and systems have been used in the industry for a variety of reasons, and under a variety of conditions. There has to be a way of communicating potential leak incidents to a property owner, manager, resident, or other person responsible for a dwelling or property. The invention including its various embodiments, improves on the deficiencies of the prior art and provides a novel backflow valve assembly, which also includes the option of having a leak alarm and notification system.

SUMMARY OF INVENTION

By way of this invention, a novel backflow valve is described which consists of a back flow valve assembly including an internal washer having a central opening and a freely movable, floatable ball, such that when water flows into the drain of a basin, etc. to which the assembly is connected, it is free to flow though the drain to the drain system beyond. On the other hand, if the downstream drain system becomes clogged, water filling the system will eventually back up to float the ball until it engages with the internal washer, thus forming a seal to cut off any further back flow.

In one embodiment, the back flow valve consists of a cylindrical housing having a cylindrical coupler at each end of the housing so that the assembly may be connected in line with an existing drain system, with an extended arm or support rail that projects into the chamber of the housing to act as a support for the floatable ball positioned atop the rail. In one embodiment, the supporting rail is provided at its one end with a small pad (or platform), upon which the ball can be seated. In another embodiment, the combination arm and pad can extend to the center of the cylindrical valve assembly. In yet other embodiments the arm may extend across to the other side of the cylindrical assembly, and the platform can be circular, square, rectangular hexagonal, etc., or even spherical. The platform may be spherical to allow for the floatable ball to be in fluid motion with the platform, thereby further facilitating unobstructed water flow down the drain system.

It is to be understood that the embodiments described herein are not limited to the details of construction, processes, or to the arrangements of the components set forth in the above summary and below description, or as illustrated in the drawings. Rather, the invention may be practiced in numerous forms and embodiments. Also, it is to be understood that the phraseology and terminology employed herein are for the purpose of the description and should not be regarded as limiting.

Embodiments, examples, features, aspects, and advantages of the present disclosure will become better understood with regard to the following description, appended claims and accompanying drawings.

BRIEF DESCRIPTION OF THE DRAWINGS

So that the above-recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The foregoing aspects and the attendant aspects of the present disclosure will become more readily appreciated by reference to the following detailed description, when taken in conjunction with the accompanying drawings, wherein:

FIG. 1 includes FIGS. 1A and 1B, wherein

Reference symbols or names are used in the Figures to indicate certain components, aspects or features shown therein. Reference symbols common to more than one Figure indicate like components, aspects or features shown therein.

DETAILED DESCRIPTION OF INVENTION

Various aspects of specific embodiments are disclosed in the following description and related drawings. Alternate embodiments may be devised without departing from the spirit or the scope of the present disclosure. Additionally, well-known elements of exemplary embodiments will not be described in detail or will be omitted so as not to obscure relevant details. Further, to facilitate an understanding of the description, a discussion of several terms used herein follows.

The word "exemplary" is used herein to mean "serving as an example, instance or illustration." Any embodiment described herein as "exemplary" is not necessarily to be construed as preferred or advantageous over other embodiments. Any embodiment described herein as "preferred" is not necessarily to be construed as limiting, or as limited only to the specifically described embodiment. Likewise, the term "embodiments" or "configuration" is not exhaustive and does not require that all embodiments or configurations include the discussed feature, advantage or mode of operation.

The detailed description set forth below is intended as a description of presently-preferred embodiments of the invention and is not intended to represent the only forms in which the present invention may be constructed and/or utilized. However, it is to be understood that the same or equivalent functions and results may be accomplished by different embodiments that are also intended to be encompassed within the spirit and scope of the invention, and additional variations of the present invention may be devised without departing from the inventive concept. The description itself is not intended to limit the scope of any patent issuing from this description. Rather, the inventors have contemplated that the claimed subject matter might also be embodied in other ways, to include different elements or combinations of elements similar to the ones described in this document, in conjunction with other present or future technologies.

Figure 1A:
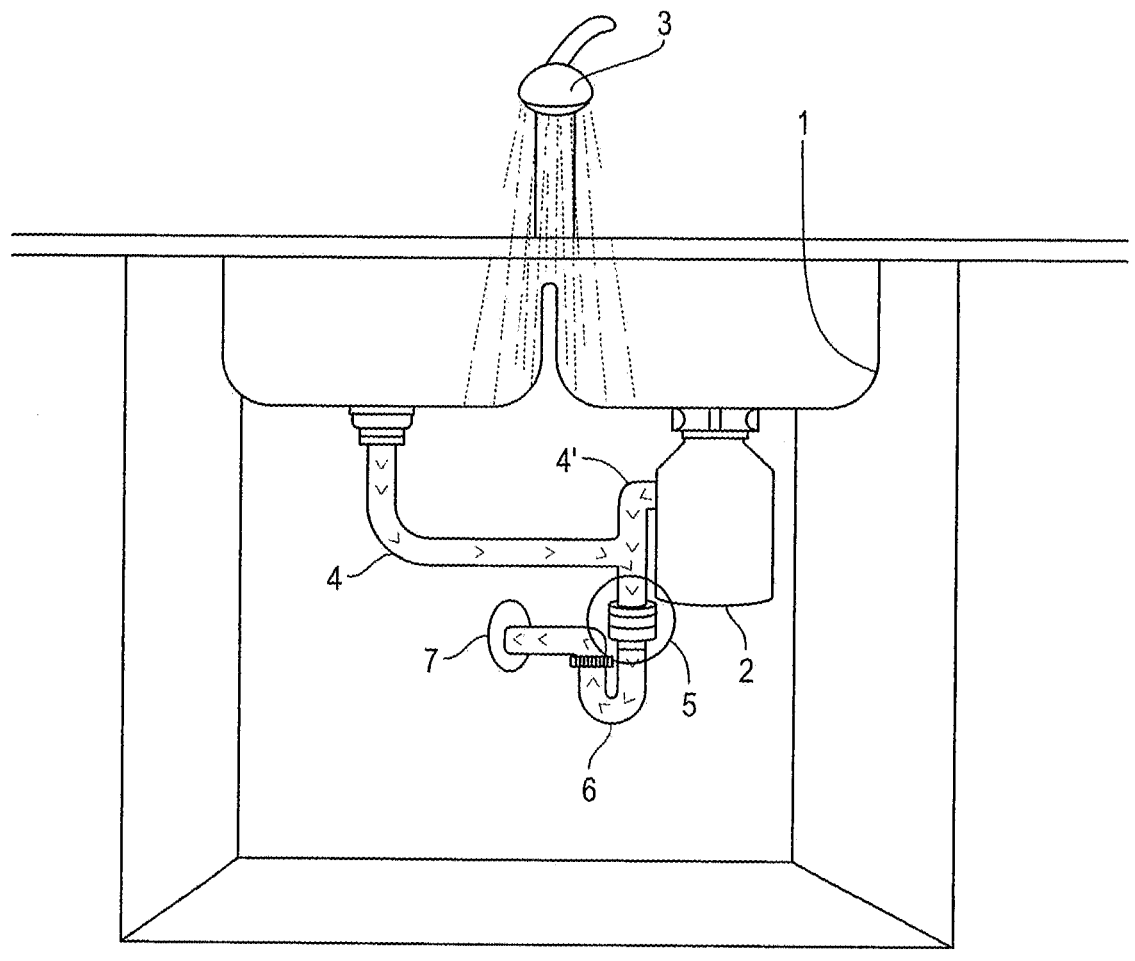
FIG. 1A depicts a typical environment in which an embodiment of the back flow value of the invention may be employed.

With reference now to the figures, and in particular FIG. 1A, a typical kitchen sink arrangement is illustrated, including a sink 1 having two basins, one of which is provided with a garbage disposal 2. Shown above the sink is a movable arm sink faucet 3, each basin of the sink provided with its own drain line 4 and 4'. The converging drain lines 4 and 4' are connected to back flow assembly 5, in turn connected to U shaped air trap 6, which in turn is connected to drain stub 7, which itself is connected to a main drain line (not shown).

Figure 1B:
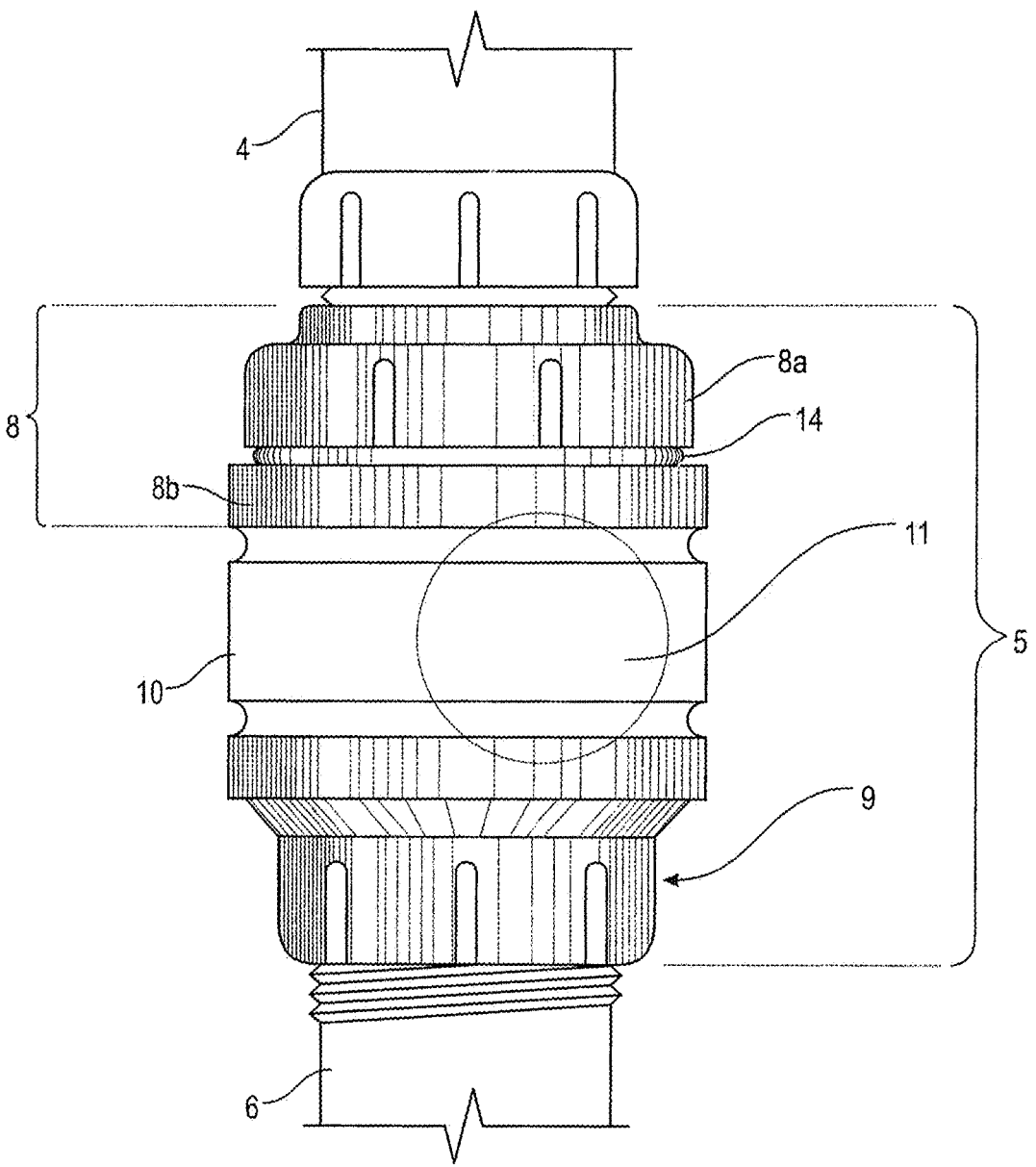
FIG. 1B depicts a detail of the back flow value of FIG. 1A.

With reference now to FIG. 1B, the drain valve 5 of this invention is depicted in enlarged view of that shown in FIG. 1A, the valve assembly sized to connect with drain lines 4 and 6, via couplers 8 and 9.

The central cylindrical body 10 of back flow value 5 is shown with floatable ball 11 in place, inside body 10, displayed in this view for illustrative purposes only, ball 11 supported by a support arm (not shown). Illustrated is the general position of the ball when the sink is not in use or when the water is running through the drain system.

Coupling 8 is in one embodiment comprises two parts, a lower coupling 8a which may be threadably engaged with an upper coupling 8b. In the embodiment shown, 8b is threaded to engage the threaded ends of drain pipe 4 and coupling 9 threaded to engage with the threaded ends of drain pipe (air trap) 6. In another embodiment, the couplings 8b and 9 may be glued to cylindrical body 10.

Figure 2:
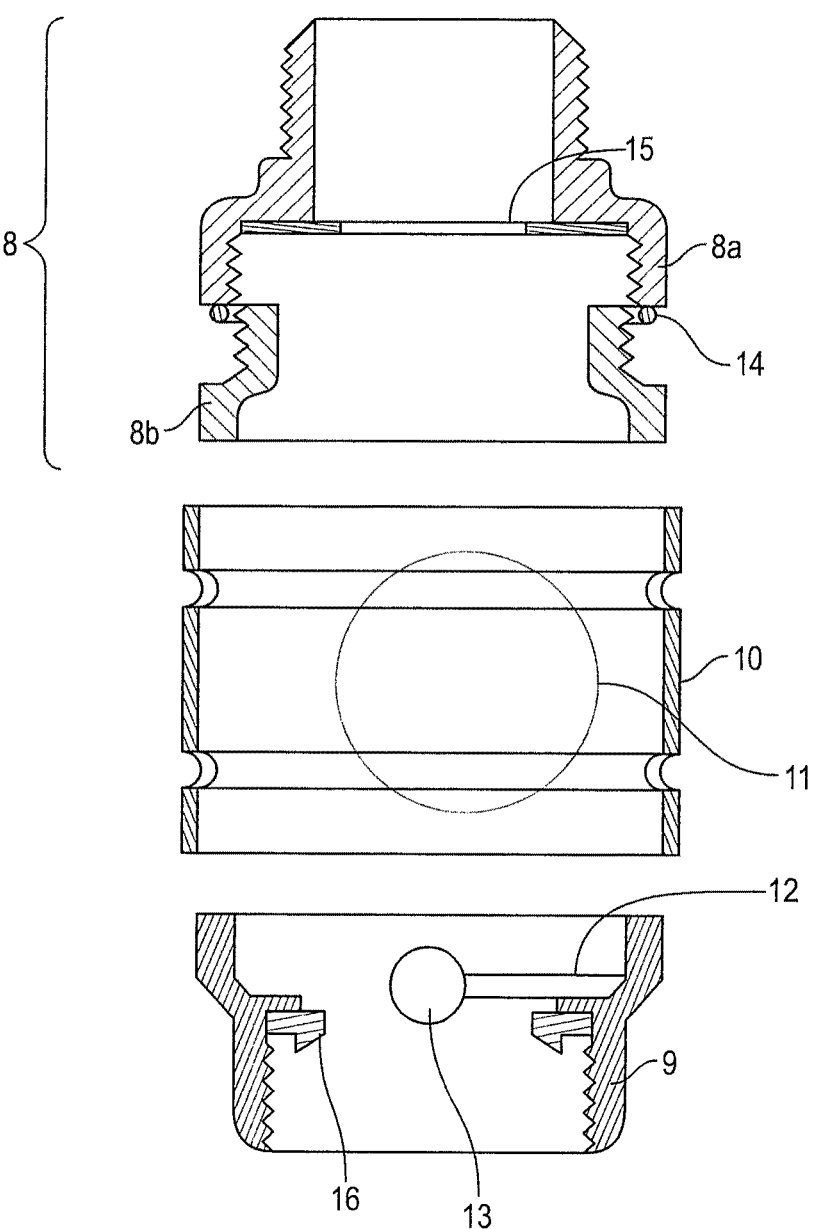
FIG. 2 is a cutaway view of the back flow valve of FIG. 1B.

With reference to FIG. 2, in between upper and lower couplings 8a and 8b, is large circular washer 15 which provides a restricted central circular opening with which floatable ball 11 can engage when there is backflow in the drain system, as later discussed in connection with FIG. 3B. In one embodiment a rubber washer 14 can be provided between couplers 8a and 8b to help prevent leakage between the parts.

Coupling 9, in addition to providing for engagement to the downstream portion of the drain system, is preferably threaded to engage with the leading end of that system. Coupling 9 houses a supporting arm 12 which engages with and prevents ball 11 from entering the drain system and being carried away by gravity or by water flow. In one embodiment, arm 12 can be formed as part of the body of coupler 9. In another embodiment, it can be removable such as an integral part of an insertable ring, so as to be easily replaced.

Figure 3A:
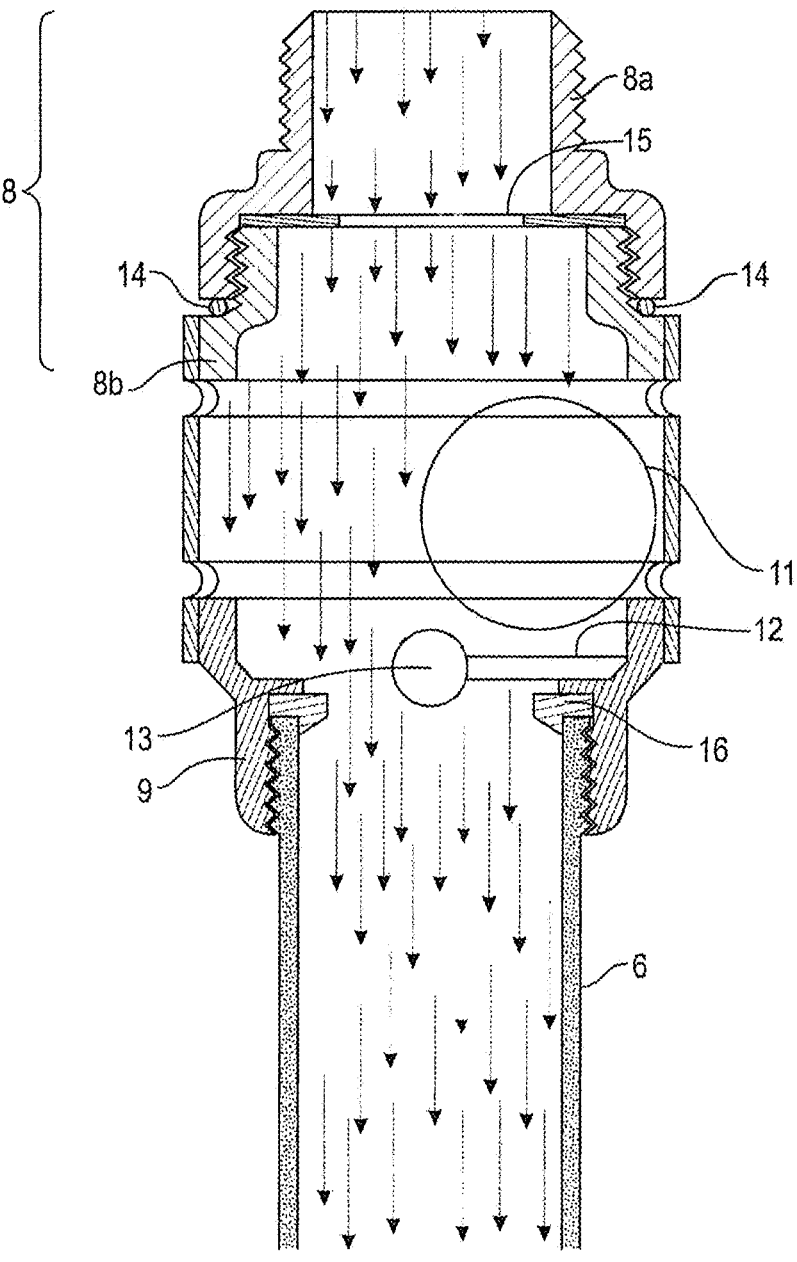
FIG. 3A is a cutaway view of the valve of this invention, depicting the valve in open mode with water flowing through the system.

As shown in FIG. 2, support arm 12 extends to the approximate midpoint of the pipe, and in the embodiment depicted has at its end a pad or platform 13, which as illustrated is a sphere. With the sphere-shaped platform, the floatable ball 11 is nudged into the rest position shown. This is best illustrated in FIG. 3A, where ball 11 is shown resting up against the inside wall of central cylindrical body 10. The spherical shape of the platform allows for the ball 11 to roll freely upon it, in a fluid motion, thereby further facilitating an unobstructed flow of water.

Turning now to the operation of the back flow valve, FIG. 3A shows the valve in an open position, allowing water to freely flow from the drain of a sink or tub into a drain system beyond, and ultimately away from the structure. Gravity as well as the force of downward flowing water moves the floatable ball 11 to the open, or neutral position. The force of the downward flowing water moves the ball 11 to be in contact with the platform 13, rolling freely within the cylindrical body.

Figure 3B:
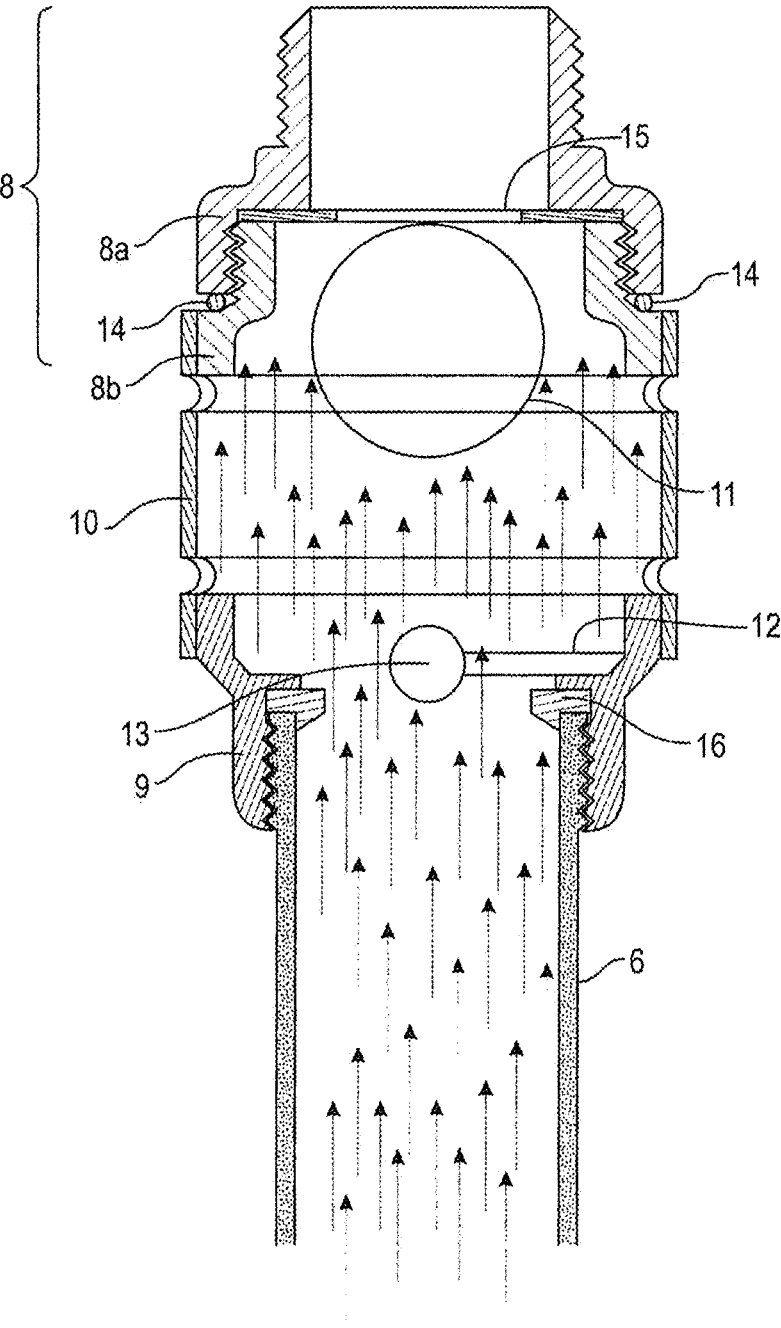
FIG. 3B is a cutaway view of the valve of this invention, depicting the valve in closed mode, where water is backing up, and the flow has been reversed.

FIG. 3B depicts a situation where a downstream drain is clogged at a point beyond the backflow valve, potentially causing a reverse flow. The pressure of this flow, combined with the hydrostatic head created by flowing water to a sink above (not shown), acts on the floatable ball 11, causing it to rise withing the central body of the valve, to lift the ball until it is at some point forced up against the opening of the large washer 15, thus closing the valve, and preventing the water backflow. The direction of water in both FIGS. 3A and 3B is indicated by the straight lines ended by arrows.

Figure 4:
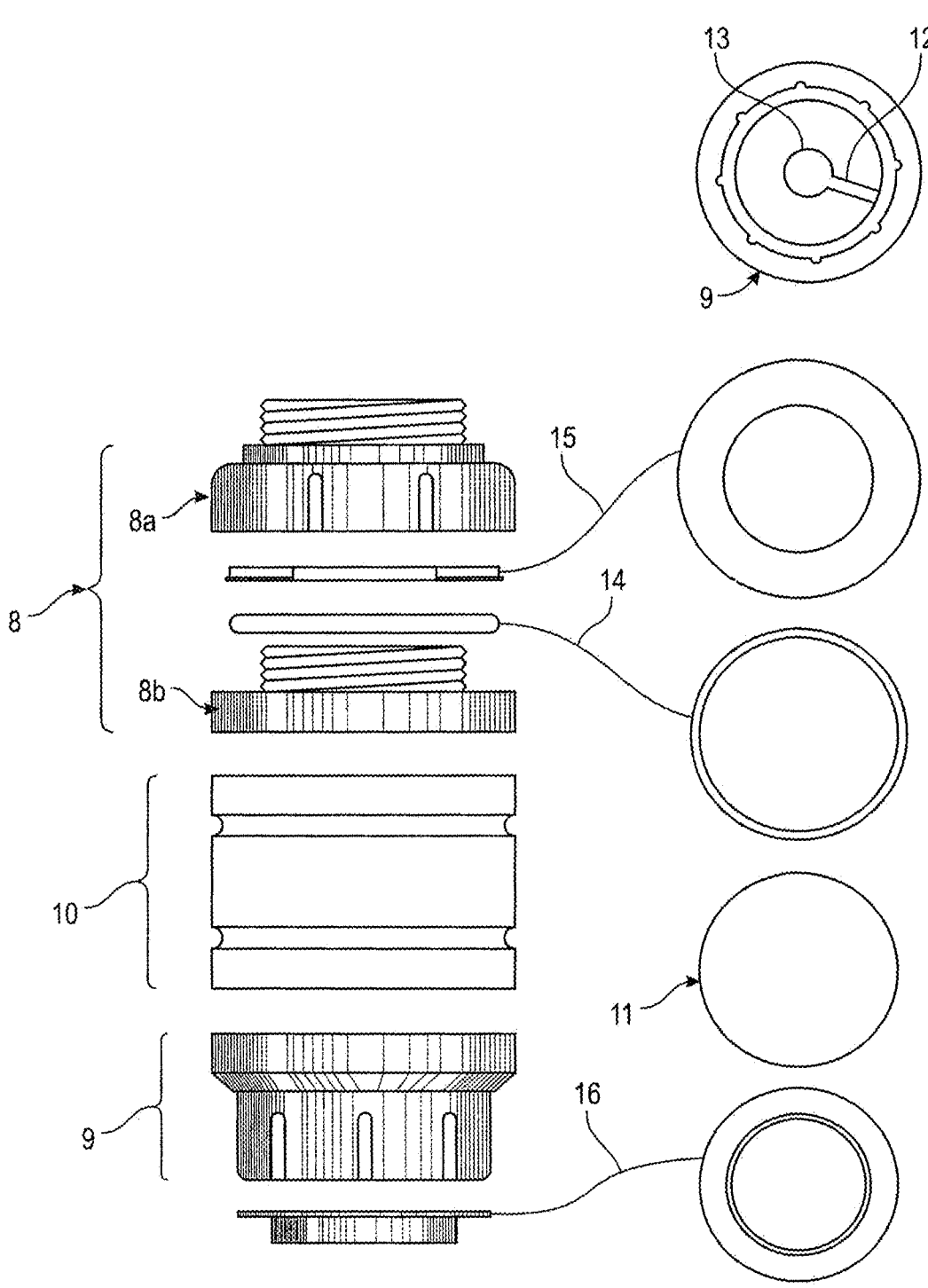
FIG. 4 is an exploded plan view of the back flow valve assembly of FIG. 2. In the embodiment shown, the various parts of the back flow assembly are illustrated.

With reference now to FIG. 4, the major parts of an exemplary embodiment of the valve assembly are shown in exploded view, with coupler 8, comprising upper and lower couplers 8a and 8b, with large circular rubber washer 15 and ring washer 14 disposed in between. In the depicted embodiment, the coupler 9, which may be threaded to engage the threaded ends of a drain pipe (not shown), may also have a washer or a fitting 16 to help with a secure fit and/or help prevent leakage between the parts. As shown herein, coupler 9 houses a supporting arm 12 with a spherical platform 13 at its end.

The size of the central opening of the washer 15 is not critical. However, it must be small enough, such as less than the diameter of floating ball 11 so as to securely engageable with floating ball 11 when the two are brought into contact. However, it should also be large enough to provide a pathway sufficient to allow water draining from an appliance to freely flow through the valve. In one embodiment the washer can be made of rubber. In another it may be made of metal, plastic or the like, the type of material not critical so long as it is deformable like rubber, can withstand the forces in the valve, and not be subject to excessive degradation in use. The washer, by way of example, can be of various sizes depending on the connecting pipe, either 1¼ or 1½, the standard sizes for sinks in homes and apartments.

One of the advantages of the backflow valve assembly of this invention is that the parts are readily available, and the valve assembly itself may easily but put together purchasing parts from typical plumbing, or hardware stores. In addition, the floatable ball 11, in one embodiment, if properly sized can be a ping pong ball, or a ball of similar density and structure, which can be made from materials including but not limited to plastic, and more specifically Acrylonitrile Butadiene Styrene (ABS) plastic. Similarly, the arm 12 and platform 13 may also be made of plastic material. Most of the parts, are readily available from hardware stores such as Home Depot, Lows, Big Five, True Value Hardware, Ace Hardware, etc. For example, parts 8a, 8b, 11, 14, and 15 are readily available. In the exemplary embodiments described herein, parts 9 and 10 require manufacture, the few parts requiring fabrication contributing to the low cost of the device.

Figure 5A:
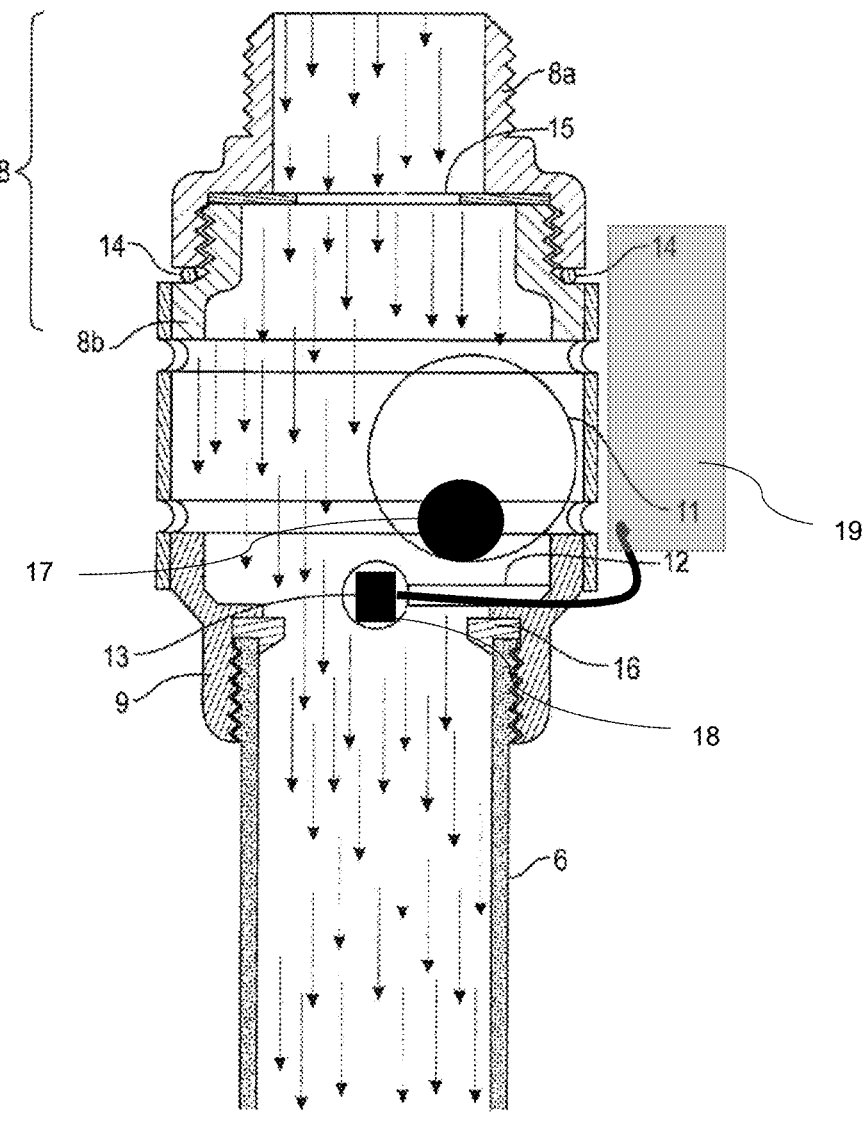
FIG. 5a is a cutaway view of the valve of an embodiment of this invention, showing an embodiment of the leak sensor and alarm system depicting the valve in open mode with water flowing through the system, and with the alarm sensor in magnetic contact.

With reference to FIG. 5a, it shows an embodiment of the leak sensor and alarm system in the general locations described herein. FIG. 5a is a cutaway view of the valve of an embodiment of this invention, showing an embodiment of the leak sensor and alarm system depicting the valve in open mode with water flowing through the system. An embodiment of this system includes poles 17 and 18, which may comprise magnetic contact sensors, which are made up of two parts: a magnet and a sensor body which utilize magnetic fields to track movement between the two poles. The first pole 17 is located on the ball 11 as shown. The second pole 18 is located on the platform 13. When in resting position, the poles are in contact (such through as a continuous loop electrical current), and the system is in a closed state.

Figure 5B:
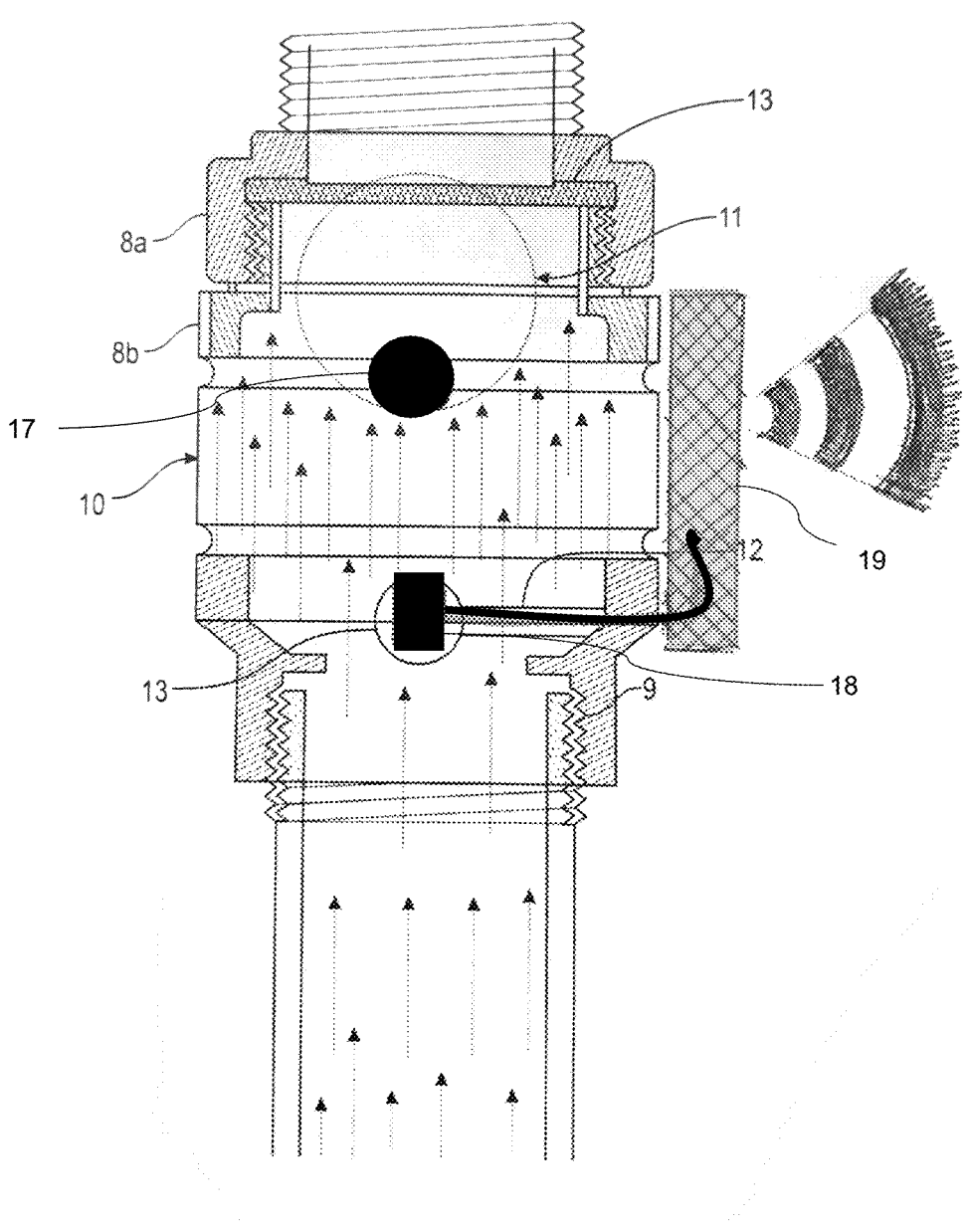
FIG. 5b is a cutaway view of the valve of an embodiment of this invention, showing an embodiment of the leak sensor and alarm system, where water is backing up, resulting in magnetic contact being broken, thereby causing an alarm to go off.

Referring to FIG. 5b, when there is a blockage and water is backing up, the ball 11 and platform 13 separate and the current between the first pole 17 and the second pole 18 are broken, breaking the sensor's magnetic field and flipping a switch, such as a reed switch 19. This break in contact trips an electrical circuit which then sends a signal (audible or visual), or a wireless signal utilizing the system described hereinbelow, notifying a person that there is overflow or water back up which may potentially cause a leak. The alarm or signal can be turned on or off through use of a manual switch or a wireless or remote control switch. This leak detection system may be a stand-alone system, or may be incorporated into a larger notification system such as the system described below.

Figure 6:
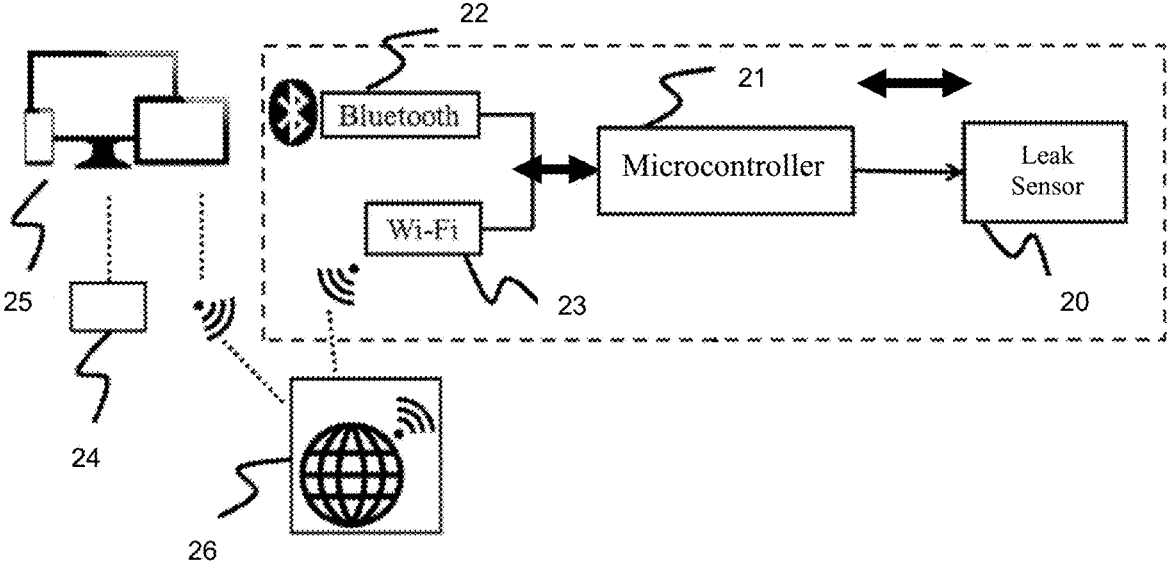
FIG. 6 illustrates an exemplary block diagram of an embodiment showing the wireless notification system of the present invention.

FIG. 6 shows another embodiment of the leak detection system of the present invention comprising: at least one leak sensor 20 adapted to detect a leak; at least one microcontroller 21 adapted to receive and interact with a signal from the leak sensor 20, with the microcontroller 21 acting as a processor and a communication server; and at least one wireless communication module 22 and/or 23 adapted to receive the signal from the microcontroller, whereby in the event of a leak, the wireless communication module transmits an electronic message to at least one user 24 such as through the user's electronic device 25, such as for example, a computer 25, tablet 25, or smartphone 25 (such as through an app). The microcontroller 21 electronically communicates with communication protocols or modules such as, for example, a short range wireless communication (e.g., Bluetooth) module 22 or a wireless internet communication (e.g. WiFi) module 23. Thereafter, the short range wireless communication module 22 or the wireless internet communication module 23 communicates with the user's computer, laptop, tablet, and/or smartphone 25 via notification protocols such as an internet server, LAN server, cloud, or through direct network point communications. This system may incorporate the leak detection system described in FIGS. 5a and 5b, such as when magnetic contact or current between the first pole 17 and the second pole 18 are broken in the event of a leak. This break in contact trips an electrical circuit (or such as through a reed switch) which then causes the leak sensor 20 to send a signal to the microcontroller 21.

In another embodiment, Bluetooth, and WiFi, are the two exemplary means to connect to the sensing device wirelessly. Bluetooth enabled devices, such as, smartphones, can discover, and connect, the sensor, within the signal range. Custom built applications on the smart device (called "apps") can configure and monitor the sensor device. In one exemplary embodiment, one or more sensor devices is connected to the microprocessor (or microcontroller) via WiFi. In another embodiment, one or more sensor devices is connected physically. Once a leak is detected by the sensor 20, it communicates with the microprocessor 21 which then communicates wirelessly to the app, which alerts the user 123 through a notification (such as text, phone call, and/or a push notification that pops up on a phone's screen), or an audible alarm. The user can configure and monitor the sensor for leaks through the app, and can also turn off the alarm and/or change the notification preferences. Sensor configurations that may be modified include, but are not limited to, date and time information, sensor sensitivity, and user information to identify the specific location (for example, apartment unit number) of the leak. Moreover, WiFi enabled leak alerts and/or alert history can be accessed remotely from the Internet 26. The user can configure the alarm system to pair or sync one or more smart devices, and can also configure which devices receive leak notifications as well as the type of notification. The app can be selectively programmed to provide a custom defined set of pre-set alerts/alarms/messages, including text messages, telephone recording messages or emails in identifying a leak.

In other embodiments, the notification device can include a stand-alone device which generates an alert sound through a speaker and/or or a light such as a flashing LED light when a leak is detected, notifying the home owner, resident, property manager, or any other user. The power source of the leak notification system can be through electrical wiring and/or through one or more batteries.

In an exemplary embodiment, the leak sensors are capable of detecting a leak by measuring the electrical conductivity at two ends of its metal probe. Once the conductivity of a liquid, such as, water between the two metal probes is detected and/or reaches a defined point, an internal signal turns on or is activated, and an alert signal is sent to the microcontroller. The microcontroller then communicates to the user in any of the various modes discussed above.

The various embodiments of the backflow valve assembly are particularly effective in larger apartment buildings, having many floors, where bathroom and kitchen plumbing features are often stacked floor to floor, and such stacked plumbing connected to the same vertical drain line. In such an environment, a clog which develops at the base of the line, or anywhere else along the line, can cause water to overflow into sinks above the clogging point, eventually causing spill-over onto the floor, potentially resulting in water damage to that that unit and units below. The embodiments described herein provides a way to monitor multi-unit dwellings, other buildings and equipment for water leaks so that reparative action can be taken in a timely manner, and thus, costly and time consuming damages could be prevented.

The inventions described herein can be used in new constructions of new two-story homes, or multiple residential units. The invention can also be used in existing single as well as in multiple units of two or more floors.

Although specific embodiments of the disclosure have been described, various modifications, alterations, alternative constructions, and equivalents are also encompassed within the scope of invention as set forth in the claims.

Thus, the present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

The embodiments of the present invention as described more fully with reference to the accompanying drawings, which form a part hereof, and which show, by way of illustration, specific exemplary embodiments by which the invention may be practiced. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may. Additionally, the phrase "in another embodiment" as used herein does not necessarily refer to a different embodiment, although it may. Thus, various embodiments of the invention may be readily combined, without departing from the scope or spirit of the invention.

Still further, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The specification and drawings are, accordingly, to be regarded in an illustrative rather than a restrictive sense. It will, however, be evident that additions, subtractions, deletions, and other modifications and changes may be made thereunto without departing from the broader spirit and scope of invention as set forth in the claims.

The invention claimed is:

1. A back flow valve assembly comprising:
   a first coupling member at the intake end of a valve assembly;
   a second coupling member at the discharge end of the valve assembly;
   a central cylindrical body disposed between the first and second coupling members, wherein the coupling members and the central cylindrical body together defining a fluid passageway;
   a floatable ball positioned within the cylindrical central body;
   a washer having a restricted central opening, wherein the washer is positioned between the central cylindrical body and the first coupling member such that it can engage the floatable ball when the ball is in a raised position, to sealably close the central opening of the washer;
   wherein the second coupling member includes a central arm which extends into the interior of the coupling member, the length of the arm is sufficient to support and maintain the floating ball within the cavity of central body.

2. The back flow valve assembly of claim 1 wherein when the floatable ball is in a lowered position, a fluid passageway within the valve is defined, allowing for the free flow of fluid through the valve.

3. The back flow valve assembly of claim 1 wherein when the floatable ball is in a raised position, in engagement with the restricted central opening of the washer to close the opening, the backflow of fluids is prevented.

4. The back flow valve assembly of claim 1 further comprising a wireless alarm system wherein the wireless alarm system comprises:

> at least one microcontroller, at least one leak sensor; and a wireless communication module;
> wherein the microcontroller is adapted to receive a signal from the at least one leak sensor;
> wherein the leak sensor is adapted to detect a fluid leak;
> wherein the wireless communication module is adapted to receive a signal from the microcontroller;
> wherein when the leak sensor detects a fluid leak and sends a signal to the microcontroller, the microcontroller sends a signal to the wireless communication module which in turn transmits an electronic alarm to at least one user such as through the user's electronic device.

5. The back flow valve assembly of claim 4 wherein the electronic device is selected from the group consisting of: a computer, a tablet, and a smartphone.

6. The back flow valve assembly of claim 4 wherein the wireless communication module is a short range wireless communication module.

7. The back flow valve assembly of claim 4 wherein the wireless communication module is a wireless internet communication module.

8. The back flow valve assembly of claim 4 wherein the wireless alarm system is configured to be usable with the user's electronic device to allow the user to configure the alarm system.

9. The back flow valve assembly of claim 1 wherein the central arm includes a spherical platform.

10. The central arm of claim 9 wherein the vertical axis of the spherical platform lies along the longitudinal axis of the valve body.

11. The back flow valve assembly of claim 1 wherein the central arm is removable.

12. A back flow valve assembly with a leak detection system, comprising:

> a first coupling member at the intake end of a valve assembly;
> a second coupling member at the discharge end of the valve assembly;
> a central cylindrical body disposed between the first and second coupling members, wherein the coupling members and the central cylindrical body together defining a fluid passageway;
> a floatable ball positioned within the cylindrical central body;
> a washer having a restricted central opening, wherein the washer is positioned between the central cylindrical body and the first coupling member such that it can engage the floatable ball when the ball is in a raised position, to sealably close the central opening of the washer;
> a leak sensor comprising a first pole and a second pole;
> a switch that is operably connected to the first pole and the second pole such that when the water level rises, the > connection between the first pole and the second pole is broken, tripping the switch which then triggers an alarm signal.

13. The back flow valve assembly of claim 12 wherein when the floatable ball is in a lowered position, a fluid passageway within the valve is defined, allowing for the free flow of fluid through the valve.

14. The back flow valve assembly of claim 12 wherein when the floatable ball is in a raised position, in engagement with the restricted central opening of the washer to close the opening, the backflow of fluids is prevented.

15. The back flow valve assembly of claim 12 wherein the signal can be turned on or off through use of a manual switch or a wireless or remote control switch.

16. The back flow valve assembly of claim 12, wherein the second coupling member includes a central arm which extends into the interior of the coupling member, the length of the arm is sufficient to support and maintain the floating ball within the cavity of central body.

17. The back flow valve assembly of claim 16 wherein the central arm includes a spherical platform.

18. A back flow valve assembly with a wireless leak detection system, comprising:

> a first coupling member at the intake end of a valve assembly;
> a second coupling member at the discharge end of the valve assembly;
> a central cylindrical body disposed between the first and second coupling members, wherein the coupling members and the central cylindrical body together defining a fluid passageway;
> a floatable ball positioned within the cylindrical central body;
> wherein the second coupling member includes a central arm which extends into the interior of the coupling member, the length of the arm is sufficient to support and maintain the floating ball within the cavity of central body;
> a washer having a restricted central opening, wherein the washer is positioned between the central cylindrical body and the first coupling member such that it can engage the floatable ball when the ball is in a raised position, to sealably close the central opening of the washer;
> an alarm system comprising:
> at least one microcontroller, at least one leak sensor; and a wireless communication module;
> wherein the microcontroller is adapted to receive a signal from the at least one leak sensor;
> wherein the leak sensor is adapted to detect a fluid leak;
> wherein the wireless communication module is adapted to receive a signal from the microcontroller;
> wherein when the leak sensor detects a fluid leak and sends a signal to the microcontroller, the microcontroller sends a signal to the wireless communication module which in turn transmits an electronic alarm to at least one user such as through the user's electronic device.

19. The back flow valve assembly of claim 18 wherein the wireless alarm system is configured to be usable with the user's electronic device to allow the user to configure the alarm system.

* * * * *